(12) United States Patent
Maeba et al.

(10) Patent No.: US 8,138,253 B2
(45) Date of Patent: Mar. 20, 2012

(54) FILLER FOR POWDER COATING MATERIAL AND POWDER COATING COMPOSITION CONTAINING THE SAME

(75) Inventors: Takeshi Maeba, Hyogo (JP); Nariatsu Uto, Hyogo (JP); Takanobu Sakai, Hyogo (JP)

(73) Assignee: Maruo Calcium Company Limited, Akashi-Shi (JP)

(*) Notice: Subject to any disclaimer, the term of this patent is extended or adjusted under 35 U.S.C. 154(b) by 0 days.

(21) Appl. No.: 11/991,385

(22) PCT Filed: Sep. 6, 2006

(86) PCT No.: PCT/JP2006/318102
§ 371 (c)(1),
(2), (4) Date: Mar. 4, 2008

(87) PCT Pub. No.: WO2007/029869
PCT Pub. Date: Mar. 15, 2007

(65) Prior Publication Data
US 2009/0227720 A1 Sep. 10, 2009

(30) Foreign Application Priority Data
Sep. 6, 2005 (JP) ................... 2005-257432

(51) Int. Cl.
*C08K 3/26* (2006.01)
*C09D 17/00* (2006.01)
*B07B 1/00* (2006.01)
*B02C 17/00* (2006.01)
*B02C 17/02* (2006.01)
*C09C 1/02* (2006.01)

(52) U.S. Cl. ..... 524/425; 524/904; 209/233; 241/24.15; 106/464

(58) Field of Classification Search .......... 524/425, 524/904; 209/233; 241/24.15; 106/464
See application file for complete search history.

(56) References Cited

U.S. PATENT DOCUMENTS
5,275,651 A * 1/1994 Minayoshi et al. .......... 106/464
5,288,784 A * 2/1994 Minayoshi .................. 524/425

FOREIGN PATENT DOCUMENTS
| JP | 2002-220547 | | 8/2002 |
| JP | 2002-338896 | | 11/2002 |
| JP | 2003026866 | A * | 1/2003 |
| JP | 2003055614 | A * | 2/2003 |
| JP | 2003-146629 | | 5/2003 |
| JP | 2004-10735 | | 1/2004 |

OTHER PUBLICATIONS

Allen, T. Particle Size Measurement vol. 1. 5th Ed. London: Chapman & Hall, 1997.*
(Continued)

*Primary Examiner* — Kat Wyrozebski
*Assistant Examiner* — Anthony H Sheh
(74) *Attorney, Agent, or Firm* — Kratz, Quintos & Hanson, LLP

(57) ABSTRACT

A filler for powder coating materials is provided, which comprises inorganic parties having a Mohs hardness of 1 to 4 and satisfying the following particle size distribution of the following relationships (1) to (5):

$$2 \leq A \leq 30 \quad (1);$$

Cumulative 50 vol. % diameter (median diameter) determined by Microtrac FRA [μm];

$$0 \leq B \leq 35 \quad (2);$$

Cumulative undersize for one-half the cumulative 50 vol. % diameter (median diameter) determined by Microtrac FRA [vol. %];

$$1 \leq C \leq 25 \quad (3);$$

Value obtained by dividing cumulative 90 vol. % diameter determined by Microtrac FRA by cumulative 10 vol. % diameter [-];

$$1 \leq D \leq 6 \quad (4);$$

Value obtained by dividing cumulative 75 vol. % diameter determined by Microtrac FRA by cumulative 25 vol. % diameter [-]; and $$E \leq 100 \quad (5);$$

Maximum particle diameter in particle-diameter fraction frequency distribution determined by Microtrac FRA [μm].

The filler for powder coating materials of the present invention can provide a powder coating composition for forming a coating film having excellent matte property, a smooth surface with reduced irregularities, satisfactory appearance and excellent in processability and impact resistance.

4 Claims, 4 Drawing Sheets

OTHER PUBLICATIONS

Kirk-Othmer Encyclopedia of Chemical Technology: Coating Processes, Powder, Nov. 16, 2001.*
Machine language translation of JP 2003-026866.*
Machine language translation of JP 2003-055614.*

Interpon. Complete Guide to Powder Coatings, Issue 1, Nov. 1999. http://www.interpon.com/en/Guide+To+Powder+Coatings/Complete+Guide+to+Powder+Coatings.htm.*

* cited by examiner

FILLER FOR POWDER COATING MATERIAL AND POWDER COATING COMPOSITION CONTAINING THE SAME

TECHNICAL FIELD

The present invention relates to a filler for powder coating materials and a powder coating composition containing the filler, and more particularly to a filler for powder coating materials which can suppress wear of facilities at the time of producing powder coating materials and can provide a powder coating composition for forming a coating film having excellent matte properties, a smooth surface with reduced irregularities, a satisfactory appearance, and excellent in processability and impact resistance.

BACKGROUND ART

Since powder coating is carried out using powder coating materials which contain no solvent, unlike a coating method using solvent type coating materials, the powder coating is free from environmental issues which could be caused by solvents or a risk of occurrence of disasters and further oversprayed coating materials can be recovered and made usable again, and therefore the powder coating can suppress the coating material loss to very low and has thus been employed in various coating fields, particularly in metal coating. Further, in terms of usability of conventional coating apparatus for water-based coating materials, coating methods using powder type water-based coating materials obtained by dispersing powder coating materials in water have been proposed and they are coating methods suitable for decreasing VOC (volatile organic compounds).

On the other hand, matte finish has often been done to render high grade feeling along with preference of high level for domestic electric appliances and interior panels of constructions. As powder coating materials to be used for their coating have widely been employed thermosetting powder coating materials containing mainly polyester resins, acrylic resins, and epoxy resins since they are excellent in coating film performance.

Conventionally, formation of a matte coating film is carried out by adding an inorganic matting agent such as silica and alumina to powder coating materials, however, a small amount of a matting agent is insufficient and if a large quantity of a matting agent is employed, it leads to a problem in wear of production apparatus for powder coating materials and deterioration of physical properties of coating films after coating.

For example, Japanese Patent Application Laid-Open (JP-A) No. 10-306237 proposes matting powder coating materials which are powder coating materials mixed with inorganic matting agents and obtained by depositing mica powder on the surfaces of powder coating material particles containing barium sulfate. However, the brilliant luster of the mica powder remains and uneven luster may sometimes occur. Further, there occurs a problem that undercoat luster (80° luster) remains.

Further, JP-A No. 2003-55614 proposes matting thermosetting powder coating materials obtained by spray drying organic solvent solutions containing thermosetting resins, curing agents and matting agents, and having an average particle diameter of 5 to 10 µm, however, in terms of reduction of VOC, it is needed to recover evaporated solvents and it makes complication of facilities.

Furthermore, JP-A No. 2003-192992 proposes matting agents for coating materials containing one or more kinds of inorganic fine powders selected from fine silica powder, silica-alumina, and fine alumina powder which are surface-treated with waxes containing mainly higher fatty acid esters, and energy curable compositions for coating material containing the foregoing matting agents for coating materials.

However, the above-mentioned matting coating materials containing the matting agents still have many problems in terms of workability and apparatus cost in production of the powder coating materials, relevant to environmental issues and machine wear, although improvement of the properties as powder coating materials is considerably expected.

For example, in the case of producing the powder coating materials in a dry manner, resins for forming coating films, curing agents, matting agents, stabilizers and so forth are mixed and subjected to particle size adjustment by pulverization and particle control to obtain powder coating materials. In this case, if hard inorganic components such as silica and alumina are mixed with organic components such as resins, just like sand erasers as a stationery, the hard inorganic components mixed with the resins act like abrasives, possibly cause a wear problem of a mixer, a pulverizer, a particle controller, a feeder equipped with them, a transportation tube, a storage tank, and so forth, and thus require countermeasures to wear and repair of apparatuses. Further, powder soaring tends to be easily caused due to collision of powder coating materials themselves. It is also difficult to remove wear debris of the apparatuses mixed in coating material products. In a powder coating step, it is said that the air speed near a diffuser part and a nozzle is a subsonic speed, and the transfer speed of the coating materials in a coating material hose sometimes reach ten and several meters per second and it also causes a wear problem of the hose.

On the other hand, in the case mixing is carried out in a water-based or solvent-based system, after mixing, dewatering or desolvation is carried out and successively spray drying or fluidization drying is carried out to obtain powder coating materials. In the case of carrying out the mixing in a water-based or solvent-based system, even if the hard inorganic components are mixed, it is made possible to employ a production method which does not include a step of melting and kneading and a step of mechanical pulverization, and, in this case, there is no need to consider machine wear in the step of melting and kneading or the step of mechanical pulverization, however, there occurs a problem of wear of facilities in other steps, e.g. in particle control step and a drying step. Further, in the case of a solvent-based system, there are raised additionally problems such as cost up because of VOC countermeasure and explosion prevention designs of apparatuses.

Although having a matte effect, inorganic powders such as silica which a Mohs hardness is higher than 4, lack in the surface smoothness in particular in semi-matte finish and have a problem in the appearance beauty supposedly because the particles have many edges.

Further, in the case of inorganic substances containing silica, for example, in a mixing step, a pulverizing or particle control step, or a drying step, the powder dust of substances may be formed and risk of silicosis is considered to be possible, so that particular care has to be paid for the work environments.

Further, in a coating step, since excess powder coating materials are recovered and reused, in the case of using powder coating material containing hard inorganic components, there are problems of powder soaring due to collision between powder coating material particles and wear of coating apparatus and recovery apparatus.

The present invention aims to solve the above-mentioned problems in conventional techniques, provide a filler for powder coating materials which hardly cause a problem of machine wear at the time of production and can form a coating film excellent in matte properties, finishing properties (appearance), processability, and impact resistance, and provide a powder coating composition containing the filler.

DISCLOSURE OF THE INVENTION

Under the above-mentioned state of the art, the present inventors have made an extensive series of investigations and accordingly have found that a filler for powder coating materials which comprises inorganic particles having a specified particle size distribution and a Mohs hardness of 1 to 4 can provide a powder coating composition hardly causing a machine wear problem at the time of production and also a powder coating composition for forming a coating film excellent in matte properties, finishing properties (appearance), processability, and impact resistance, and these findings now lead to the completion of the present invention.

That is, the first present invention provides a filler for powder coating materials which comprises inorganic parties having a Mohs hardness of 1 to 4 and satisfying the following particle size distribution of the following relationships (1) to (5):

$$2 \leq A \leq 30 \tag{1},$$

$$0 \leq B \leq 35 \tag{2},$$

$$1 \leq C \leq 25 \tag{3},$$

$$1 \leq D \leq 6 \tag{4), and}$$

$$E \leq 100 \tag{5}$$

wherein,

A: Cumulative 50 vol. % diameter (median diameter) of the inorganic particles determined by a laser type particle size distribution meter (Microtrac FRA) [μm];

B: Cumulative undersize for one-half the cumulative 50 vol. % diameter (median diameter) of the inorganic particles determined by a laser type particle size distribution meter (Microtrac FRA) [vol. %]

C: Value obtained by dividing cumulative 90 vol. % diameter of the inorganic particles determined by a laser type particle size distribution meter (Microtrac FRA) by cumulative 10 vol. % diameter [-];

D: Value obtained by dividing cumulative 75 vol. % diameter of the inorganic particles determined by a laser type particle size distribution meter (Microtrac FRA) by cumulative 25 vol. % diameter [-]; and E: Maximum particle diameter of the inorganic particles in particle-diameter fraction frequency distribution determined by a laser type particle size distribution meter (Microtrac FRA) [μm] (claim 1).

As a preferable aspect, the filler for powder coating materials according to claim 1, wherein the inorganic particles have a powder specific surface area Sw under constant pressure ventilation from 4050/ρ to 40500/ρ (cm²/g), wherein ρ denotes an absolute specific gravity of the inorganic particles (claim 2).

As a preferable aspect, the filler for powder coating materials according to claim 1 or 2, wherein the inorganic particles are heavy calcium carbonate (claim 3).

The second present invention provides a powder coating composition which comprises a filler for powder coating material according to any one of claims 1 to 3 and a powder coating resin as indispensable components (claim 4).

As a preferable aspect, the powder coating composition according to claim 4, wherein the powder coating resin comprises a thermosetting resin (claim 5).

As a preferable aspect, the powder coating composition according to claim 5, wherein the thermosetting resin comprises at least one resin selected from polyester resins, epoxy resins, epoxy-polyester resins, fluoro resins, acrylic resins, alkyd resins, phenolic resins, melamine resins, urea resins, urethane resins, block isocyanate resins, silicone resins, and amide resins (claim 6).

As a further preferable aspect, the powder coating composition according to any one of claims 4 to 6, wherein the addition amount of the filler for powder coating materials is 1 to 75 parts by weight based on 100 parts by weight of the powder coating resin (claim 7).

BEST MODE FOR CARRYING OUT THE INVENTION

Figure 1:
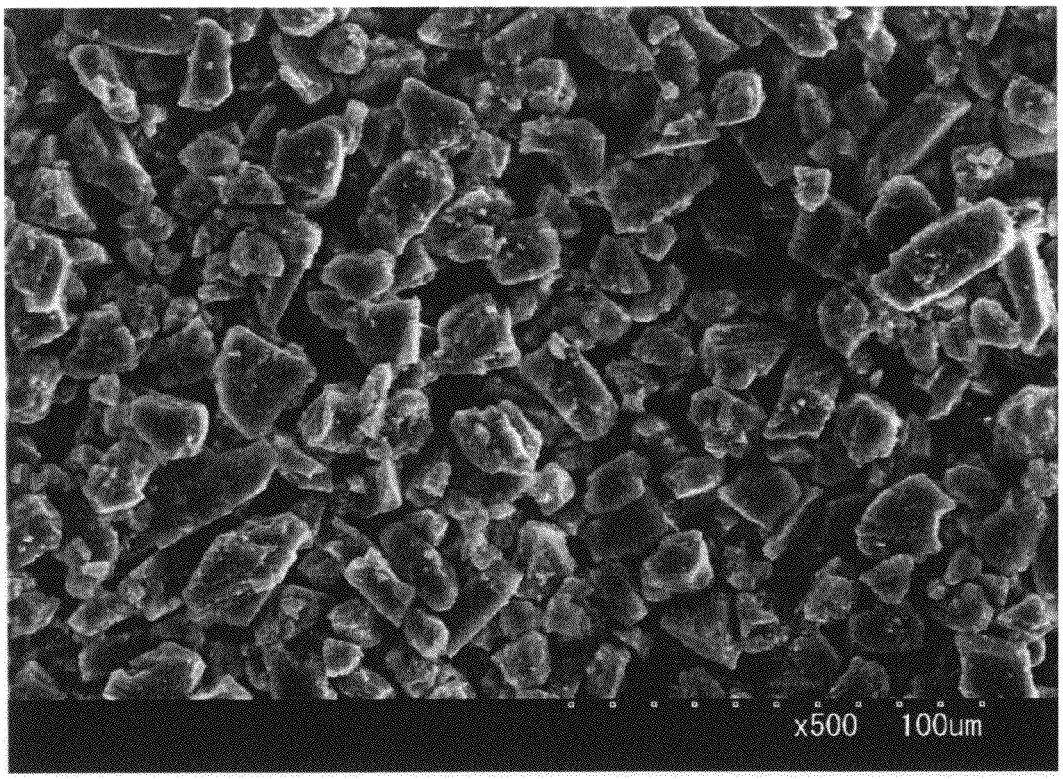
FIG. 1 shows an electron microscopic photograph (500 times magnification) of a filler for powder coating materials, which is produced in Example 5 of the present invention, having 16.2 μm for the cumulative 50 vol. % diameter A determined by Microtrac FRA.

The characteristic of a filler for powder coating materials of the present invention is that the filler contains inorganic particles having a Mohs hardness of 1 to 4 and strictly controlled particle size and particle size diameter.

The inorganic particles contained in the filler for powder coating materials of the present invention are required to satisfy $2 \leq A \leq 30$ (μm), wherein A denotes cumulative 50 vol. % diameter (median diameter).

In the case of semi-matte finish, it is required to satisfy preferably $5 \leq A \leq 20$ (μm) and more preferably $8 \leq A \leq 16$ (μm). In this case, the addition amount is preferably 5 to 40 parts by weight and more preferably 10 to 30 parts by weight based on 100 parts by weight of the powder coating resin, so that the surface projections can be made very fine and the surface appearance can be maintained.

On the other hand, in the case of matte finish, it is required to satisfy preferably $10 \leq A \leq 30$ (μm) and more preferably $15 \leq A \leq 25$ (μm). In this case, since the number of particles per unit weight is reduced, the addition amount is preferably 20 to 70 parts by weight and more preferably 30 to 50 parts by weight based on 100 parts by weight of the powder coating resin to increase the number of the surface projections.

If A is lower than 2 μm, in the case coating is carried out using the powder coating material containing the filler, the coagulation property is intensified and sufficient dispersibility cannot be obtained at the time of mixing the filler with a resin, and further the oil absorption amount becomes high to increase the viscosity at the time of heat melting, to worsen the leveling, and to deteriorate the appearance of a finished coating film. Further, the coating film becomes fragile and bad in a property of following stress, and Erichsen value is decreased and cracks are formed at the time of bending. Further, the matte effect, which is a main purpose of the present invention, is insufficient. If A exceeds 30 µm, the appearance of coating films is deteriorated.

The matte effect becomes more significant as A is increased, however, if A exceeds 30 µm, the effect becomes plateaued and therefore, in consideration of a risk of inferior appearance, A is preferably 30 µm or lower.

If the primary particle diameter of a body extender pigment itself is large and a coating film is formed using the powder coating material, the smoothness of the coating film surface is deteriorated to lower the appearance. On the other hand, if the primary particle diameter becomes small, the matte effect is decreased and the coagulation property is intensified and therefore it cannot be dispersed sufficiently when being mixed with a resin or adsorbs the resin beyond necessity to worsen leveling at the time of heat melting of the powder coating material and deteriorate the appearance of the finished coating film.

In order to make a coating film obtained by using the powder coating material have excellent smoothness, unlike common coating materials, it is considered that the coagulation energy of the powder of the powder coating material leads to deterioration of physical properties. With respect to the inorganic particles to be added there, the specific surface area becomes higher as the primary particle diameter is smaller. As the specific surface area becomes higher, the coagulation energy of the powder of the coating material becomes higher and it is considered to cause appearance deterioration. On the other hand, if the specific surface area is small (the primary particles are large), it is considered that the smoothness is deteriorated.

Further, the coagulation of the powder coating material is affected by particle diameter of the powder particles and as the particle size becomes smaller, the coagulation power becomes strong. Therefore, unlike the case of common solvent type coating materials, in order to prevent the coagulation, a chemical agent such as a surface adjustment agent or the like is added to the powder coating material. If the above-mentioned inorganic particles with relatively large specific surface area are added, the inorganic particles adsorb the chemical agent to inhibit sufficient exhibition of the function such as surface adjustment and the powder coating material itself is coagulated and thus it is considered to result in impossibility of obtaining a coating film with a satisfactory appearance. Accordingly, it is necessary that a 50% diameter A on an oversize which the inorganic particles pass through is adjusted within the above-mentioned range.

The cumulative undersize for one-half the cumulative 50 vol. % diameter (median diameter) B of the cumulative 50 vol. % diameter A satisfies $0 \leq B \leq 35$ (vol. %), preferably $0 \leq B \leq 25$ (vol. %), and more preferably $0 \leq B \leq 20$ (vol. %). As B is closer to 0 vol. %, the existence of fine particles is lessened and a desired matte property can be provided without causing a bad effect on the impact resistance of the resin or the like and therefore, it is preferable. On the other hand, if B exceeds 35 vol. %, the fine particles in the additive are increased and the number of particles effective for matting is decreased and further the viscosity of the melted resin is increased to make it impossible to add the agent to a prescribed mixing ratio and as a result, it becomes impossible to obtain a desired matte property. It is preferable that the fine powder is less and oil absorption amount is low. Usually, as a filler for powder coating materials, the oil absorption amount (linseed oil) is preferably 30 ml/100 g or lower. Although it is possible to lower the oil absorption amount by surface treatment or the like, unless the compatibility with the resin for powder coating materials is taken into consideration, there may be a problem about the weathering resistance of the coating film.

The C value calculated by dividing cumulative 90 vol. % diameter by cumulative 10 vol. % diameter satisfies $1 \leq C \leq 25$, preferably $1 \leq C \leq 20$, and more preferably $1 \leq C \leq 15$. As the C value becomes closer to 1, the fine powder ratio and the coarse powder ratio are lowered and a high amount mixing is made possible, and without causing a bad effect on impact resistance and appearance, it is made possible to provide a desired matte property to the resin. On the other hand, if the C value exceeds 25, since the particle size distribution becomes broad and fine particles and coarse particles exist together, the range of the addition amount of the fine particles is narrowed and as a result, it becomes impossible to provide a desired matte property and the coarse particles deteriorate the physical properties of the resins such as impact resistance and appearance.

Similarly, the D value calculated by dividing cumulative 75 vol. % diameter by cumulative 25 vol. % diameter satisfies $1 \leq D \leq 6$, preferably $1 \leq D \leq 4$, and more preferably $1 \leq D \leq 2.5$. As the D value becomes closer to 1, the particle size distribution becomes sharp, the number of particles in a range for contributing to the desired matte is increased, the height of the surface projections becomes even and therefore, the appearance of the coating film surface can be maintained. On the other hand, if D exceeds 6, the particle size distribution becomes broad and the luster becomes uneven.

The maximum particle diameter E in particle-diameter fraction frequency distribution is adjusted to be 100 µm or smaller, preferably 90 µm or smaller, and more preferably 60 µm or smaller. If the maximum particle diameter E exceeds 100 µm, it not only causes a bad effect on the impact resistance to the resin itself, but also forms irregular surface of the coating film due to coarse particles in some cases to deteriorate the appearance.

In this connection, for example, even when the thickness of the coating film is 60 µm or thinner, the filler is usable as long as the maximum particle diameter E is adjusted to be 100 µm or smaller. This is, upon producing the powder coating material, because Mohs hardness of the filler is 1 to 4, the particle size of the coating material particles can be adjusted relatively easily by pulverization or sieving.

When the thickness of the coating film is designed to be thin, it is necessary to remove not only particles with the maximum particle diameter of the inorganic particles measured by laser type particle size distribution meter but also coarse particles having the maximum particle diameter or larger. For example, since the inorganic particles of the present invention are adjusted in the particle size, the coarse particles can be removed easily by a vibrating sieve or the like. In the above-mentioned manner, even in the case of coating film thickness of 40 µm, a good matting powder coating material can be obtained by sieving the inorganic particles by a sieve with a 38 µm mesh size. Generally, the coating film thickness is 30 µm or thicker and the oversize of a sieve with 32 µm mesh is preferably 100 ppm or lower, more preferably 10 ppm or lower, and even more preferably 5 ppm or lower in the case of the inorganic particles.

The filler for powder coating materials of the present invention is preferable to have powder specific surface area Sw under constant pressure ventilation in a range from $4050/\rho$ to $40500/\rho$ (cm$^2$/g) ($\rho$ denotes an absolute specific gravity). In the case of heavy calcium carbonate with absolute specific gravity $\rho$ of 2.7, the powder specific surface area Sw under constant pressure ventilation is preferably 1500 to 15000 cm$^2$/g, more preferably 1500 to 7500 cm$^2$/g ($4050/\rho$ to $20250/\rho$), and even more preferably 1500 to 6000 cm$^2$/g ($4050/\rho$ to $16200/\rho$).

In the case of heavy calcium carbonate, if Sw exceeds 15000 cm$^2$/g, the fine particles existing in the additive are increased and therefore it is undesirable. In addition, in the case Sw is lower than 1500 cm$^2$/g, it not only causes a bad effect on the impact resistance of the resin itself except that the particle size distribution is very sharp, but also deteriorates the appearance of the coating film and therefore, it is not preferable. On the other hand, in order to adjust Sw to be lower than 1500 cm$^2$/g with A of 30 µm or lower, the additive has a remarkably sharp distribution and becomes costly. For example, even if it is possible for A to have spherical calcium carbonate (absolute specific gravity 2.7) with theoretically even particle size of 30 µm, Sw=10000×6/(2.7×30) and Sw becomes 741 cm$^2$/g and thus it is difficult to adjust Sw to be 1500 cm$^2$/g with A of 30 µm or lower.

It is needed to use inorganic particles having a Mohs hardness of 1 to 4 as the inorganic particles composing the filler for powder coating materials of the present invention.

The inorganic particles having a Mohs hardness of 4 or less cause less machine wear as compared with inorganic particles having a Mohs hardness of 5 or higher, and control of the particle size and the particle size distribution of the particles having such Mohs hardness within the above specified ranges makes it possible to give the filler for powder coating materials which can provide an efficient matte effect. In addition, although phosphorus, sodium, and potassium have been known as inorganic particles having a Mohs hardness of less than 1, they have high reactivity and therefore are difficult to be used as a filler.

Examples of the inorganic particles having a Mohs hardness of 1 to 4 are calcium carbonate, antimony trioxide, barium sulfate, basic magnesium carbonate, aluminum hydroxide, magnesium hydroxide, dolomite, calcium fluoride, talc, mica, and kaolin and they may be used alone or in combination of two or more, if necessary.

The inorganic particles in the present invention are preferably calcium carbonate, barium sulfate, dolomite, aluminum hydroxide, calcium fluoride, mica, talc, and kaolin, and more preferably calcium carbonate, barium sulfate, and aluminum hydroxide. Calcium carbonate is most preferable.

Among these inorganic particles, as compared with particles of such as synthetic calcium carbonate substantially having a hexahedral structure, particles with irregular polyhedral (hexahedral or higher) shape are preferable. Such particles can be obtained by pulverizing and particle-controlling natural minerals having the above-mentioned composition. However, those such as basic magnesium carbonate, magnesium hydroxide, talc, mica, and kaolin having a flat particle shape, that is, having a high aspect ratio of not lower than 3 tend to orient at the time of coating film formation and make planning of addition amount difficult as a matting coating material. Further, those obtained by pulverization and particle control of natural limestone, barite, and dolomite tend to become particles having an aspect ratio close to 1. Among them, heavy calcium carbonate obtained by pulverizing limestone and controlling the particle size is preferable in terms of relatively small specific gravity, easiness of obtaining a raw material with high purity, economical prices, and excellent in dispersibility, fluidity, and spraying property of its particles.

Because synthetic barium sulfate is a synthesized product, it has a small particle diameter and hardly has the particle size distribution as defined in the present invention, and therefore the matte effect of it is low. Accordingly, it is used mainly as a body extender pigment with high gloss. Further, barite, which is barium sulfate produced naturally, is pulverized and controlled in the particle size to give the filler for powder coating materials of the present invention, however, as compared with the heavy calcium carbonate, since it has a high specific gravity, and in order to obtain a desired matte effect, the weight parts to be added are increased to lead to disadvantage in terms of the cost.

As compared with addition of a filler containing particles such as the synthetic calcium carbonate substantially having hexahedral structure, if the filler containing particles having an irregular polyhedral (hexahedral or higher) shape is added, the matte effect is provided efficiently to the resin. The reason is not made clear, but it is considered that the synergetic effects of the irregular polyhedral structure and control of the specified particle size and particle size distribution contribute to the matte property. An abundant amount of limestone, which is a raw material of the heavy calcium carbonate, can domestically be produced and has good property. Further, it is one of most economical inorganic materials. Furthermore, it is safe on human body. Therefore, it has been used as an inorganic pigment in various fields. It is not exceptional in the powder coating material field and it has conventionally been used as a body extender pigment. Common heavy calcium carbonate having the smaller particle diameter is regarded as a higher quality, and in conventional techniques, how to make the particle diameter small or how to cut coarse powder (top cut) has most been emphasized. However, there is no highly fine powder-cut product and the heavy calcium carbonate cannot be pulled out of the area as a body extender pigment and is limited to use as a functional material.

The present inventors have found that strict control of the particle size is able to lower the cost, provide the matte function and design property, and remarkably improve the workability (lowering of the machine wear).

In order to obtain the heavy calcium carbonate, limestone produced naturally is pulverized in a dry manner or a wet manner to adjust an average particle diameter of fine particles within 2 to 30 µm. In the case of a dry manner, after pulverization by a Micron-mill, a vibration ball mill, or a roller mill or the like, classification is carried out by an air blowing classifying apparatus, or in the case of a wet manner, pulverization is carried out by a wet dispersion apparatus such as a tower mill or a fret mill and successively the particle size has to be adjusted to satisfy the above-mentioned particle size conditions. A production method is not particularly limited, however, since common (commercialized) heavy calcium carbonate is produced while being classified into grades by simple classification as economical commonly available products, those which satisfy the above-mentioned particle size conditions have not yet been produced. In order to satisfy the above-mentioned particle size conditions, it is preferable to remove coarse particles and ultrafine particles, and to adjust the particle size by repeating classification or using a fluid classifying apparatus such as a dispersion separator and a Micron Separator with high classification precision, a cyclone separator, or a sieve. A filler for powder coating materials using barite or dolomite as a raw material can be produced in the above-mentioned process.

Generally, in the air blowing classification process, since the centrifugal power is increased as the rotor rotation speed becomes higher, the cut point becomes small, and since the air blow amount is increased, it is much drawn to the fine powder side, the cut point becomes high. Further, with respect to the feed amount, as it is less, the classification precision becomes better except the case it is extremely slight. Further, as the cut point is smaller relative to the classification raw material, the particle size distribution in the coarse powder side becomes broader, however the yield is increased. Contrarily, the particle size distribution in the fine powder side becomes sharp, however the yield is decreased. Furthermore, in the case of classifying in the same conditions, as the specific gravity of classification raw materials of irregular polyhedral becomes higher, the cut point becomes smaller.

The calcium carbonate to be used in the present invention may be surface-treated (coating treatment) to improve the surface activity and the affinity with a powder coating resin.

Examples of the surface treatment agent include saturated fatty acids, unsaturated fatty acids, alicyclic carboxylic acids, resin acids, and esters, amides, alkali metal salts, and alkaline earth metal salts thereof, surfactants, silane coupling agents, high molecular weight type (co)polymers, alkali metal salts and/or alkaline earth metal salts thereof, and polyethylene waxes. These surface treatment agents may be used alone for the treatment and in combination of two or more for the treatment. Among them, although the polyethylene waxes can cause a matte effect while simply being added, they cause a synergetic effect by surface-treating inorganic particles. Alkali metal salts of saturated fatty acids or unsaturated fatty acids and alkali metal salts of resin acids also are preferable since they have good reactivity with calcium carbonate and are industrially available with ease.

The treatment amount of a surface treatment agent may be sufficient if the calcium carbonate particles may be evenly surface-treated and may properly be selected depending on the type of the powder coating resin to be used, however it is generally 0.05 to 2% by weight.

A powder coating composition of the present invention is obtained by adding the filler for powder coating materials of the present invention obtained in the above-mentioned manner to a powder coating resin. The powder coating resin is not particularly limited and those which are commonly used in powder coating material fields may be used, and examples of them are thermoplastic resins and thermosetting resins. The thermoplastic resins are not particularly limited and may include particularly vinyl resins such as polyvinyl chloride resin, polyethylene resins, polyamide resins, and fluoro resins and they may be used alone or optionally in combination of two or more. The thermosetting resins are not particularly limited and may include, for example, polyester resins, epoxy resins, epoxy-polyester resins, fluoro resins, acrylic resins, alkyd resins, phenolic resins, melamine resins, urea resins, urethane resins, block isocyanate resins, silicone resins, and amide resins and among them, particularly epoxy resins, epoxy-polyester resins, acrylic resins, fluoro resins, polyester resins and so on can be preferably used. They may be used alone or optionally in combination of two or more. When a thermosetting resin is used as the coating material resin, the powder coating composition of the present invention is preferable to contain a curing agent and a curing promoting agent.

The addition amount of the filler for powder coating materials of the present invention is preferably 1 to 75 parts by weight, more preferably 5 to 70 parts by weight, and even more preferably 10 to 50 parts by weight based on 100 parts by weight of the powder coating resin. If the addition amount of the filler for powder coating materials is less than 1 part by weight, a sufficient addition effect cannot be caused and on the other hand, if it exceeds 75 parts by weight, at the time of kneading it with the resin, it sometimes becomes impossible to form a powder coating material itself or the viscosity is increased so high to worsen the workability or a coating film itself cannot be formed and therefore it is not preferable.

In the powder coating composition of the present invention, if it is required to form a coating film with good weathering resistance, acrylic type resins are preferable to be used, if it is required to form a coating film with coating film physical properties such as impact resistance, polyester type resins are preferable to be used, and further if it is required to form a coating film with good corrosion resistance, epoxy type resins are preferable to be used. Further, if necessary, two or more kinds of resins may be used in combination by, for example, coating a resin having a lower glass transition temperature with a resin having a higher glass transition temperature.

In the present invention, when an epoxy resin is used as the powder coating resin, if necessary, a curing agent and a curing promoting agent such as phthalic anhydride, amine compounds, imidazole compounds, and dicyane-diamides can be used and other resins such as acrylic resins can be used in combination. Further, when a thermosetting acryl resin is used as the powder coating resin, if necessary, other resins such as epoxy resins and melamine resins and a curing agent such as polycarboxylic acids and block isocyanate compounds can be used.

In the present invention, when a thermosetting polyester resin is used as a powder coating resin, if necessary, other resins such as melamine resins and epoxy resins and a curing agent such as polybasic acids, block isocyanate compounds, and triglycidyl isocyanurate can be used.

The content of the above-mentioned curing agents is preferably 5 to 80 parts by weight based on 100 parts by weight of the thermosetting resin to be used as the powder coating resin. If it is less than 5 parts by weight, the curing becomes insufficient, and if it exceeds 80 parts by weight, the curing is promoted so far to deteriorate the physical properties of the coating film. The content of the above-mentioned curing promoting agents is preferably 0.1 to 5 parts by weight based on 100 parts by weight of the thermosetting resin to be used as the powder coating resin. If it is less than 0.1 part by weight, the curing becomes insufficient, and if it exceeds 5 parts by weight, the curing tends to be promoted so far that the physical properties of the coating film tend to be deteriorated.

The powder coating composition of the present invention may contain a pigment and other additives, if necessary. Examples of the above-mentioned other additives include other resins, a curing agent, a curing promoting agent or a curing catalyst, a surface adjustment agent, a plasticizer, an ultraviolet absorbent, an antioxidant, an anti-popping agent, a pigment dispersant, an impact resistance improver, and the like. The above-mentioned pigment is not particularly limited and those especially preferable to be used are titanium dioxide, red iron oxide, yellow iron oxide, carbon black, phthalocyanine blue, phthalocyanine green, and quinacridone type red pigments. They may be used alone or if necessary, in combination of two or more.

The content of the above-mentioned pigments is preferably 1 to 60 parts by weight based on 100 parts by weight of the powder coating composition. If the content is less than 1 part by weight, the effect of the pigment, e.g. coloration, cannot be caused, and if it exceeds 60 parts by weight, a coating film with satisfactory appearance cannot be obtained. The above-mentioned pigment and other additives may be contained in the particles of the powder coating material together with the powder coating resin or may be added as other particles from the powder coating resin.

The particles of the powder coating resin can be produced directly by, for example, a method such as emulsion polymerization and suspension polymerization. Further, the particles can be obtained by producing the resin by solution polymerization, bulk polymerization and the like, and pulverizing and classifying the produced resin.

A production method of the powder coating composition of the present invention includes, but not particularly limited to, a method commonly employed in powder coating material production fields. For example, the above-mentioned powder coating resin and optionally a pigment and other additives to be used are evenly mixed by a mixing apparatus such as a Henshel mixer, a Super mixer, a ball mill, a Bumbury's mixer, or the like, and the obtained mixture is then melted and kneaded by a kneading apparatus such as an extruder, heat rolls, or the like to evenly disperse the components other than the resins in the melted powder coating resin, and the obtained mixture is formed into pellets. After the obtained pellets are pulverized by an impact type pulverizer such as a hammer mill, or an air current pulverizer such as a jet mill, they are classified to give the powder coating composition of the present invention.

The above-mentioned classification can be carried out using a Tyler Standard sieve with 170 mesh, preferably 200 mesh; a fluid classifying apparatus such as a dispersion separator, a micro separator, or the like for separating and removing particles with particle size larger than 90 μm, preferably 80 μm; and a fluid classifying apparatus such as a cyclone separator, a dispersion separator, a Micron separator, or the like for separating and removing particles with particle size smaller than 1 μm.

The production method of the powder coating composition of the present invention may be, in addition to the above-mentioned method, a method involving mixing raw materials in a solvent and drying and pulverizing the obtained mixture or a method of obtaining a powder by a spray drying method. However, since the filler for powder coating materials of the present invention cause less machine wear, there is no need to dry a solvent solution and this method requires facilities for solvent recovery and prevention of explosion to result in high cost.

If such raw materials for powder coating materials are used, the pellets can be obtained by evenly dispersing the pigment and various kinds of additives in the resin component, so that the powder coating material obtained by pulverizing the pellets contains almost evenly the various kinds of the raw material components in each particle. Therefore, in a step of forming a coating film, for example, the curing reaction of the resin tends to be caused evenly and therefore, it is made possible to form a coating film with more satisfactory appearance such as smoothness.

Objects to which the powder coating composition of the present invention is applied are not particularly limited and examples thereof include steel plates for automobiles, domestic electric appliances, constructions, and miscellaneous goods, zinc phosphate-treated steel plates, aluminum, and aluminum alloy material. A coating method of the powder coating composition of the present invention may be a conventionally known method such as an electrostatic spraying method, a fluidizing and dipping method for depositing the powder coating composition of the present invention in a desired thickness on the surface of an object to be coated and thereafter burning the composition. When a thermosetting resin is used as the resin component, a cured coating film is formed.

The present invention will be described with reference to Examples, however, it is not intended that the present invention is limited to Examples. Measurement methods of the respective characteristic values will be described below.

<Particle Size Distribution>

After 5 g of inorganic particles were suspended in 50 ml of methanol and mixed well by spatula, the particles were dispersed by an ultrasonic dispersing apparatus (US-300 T, manufactured by NIHON SEIKI KAISHA LTD.) under the following conditions.

TIP SERECT: 26 (Φ)

Ultrasonic dispersion time: 1 minute

The obtained methanol suspension was added to SVR (liquid circulation container) to adjust the concentration in a manner that the loading index value becomes the median value appointed by a computer. The value was measured by a laser type particle size distribution meter (Microtrac FRA, manufactured by NIKKISO CO., LTD.).

The measurement was carried out under the following conditions.

Particle Transparency: No

Spherical Particles: n/a

Particle Refractive Index: n/a

Fluid Refractive Index: n/a

According to the above conditions, cumulative 50 vol. % diameter (median diameter) of the respective inorganic particles A; cumulative undersize for one-half the cumulative 50 vol. % diameter (median diameter) B; value obtained by dividing cumulative 90 vol. % diameter by cumulative 10 vol. % diameter C; value obtained by dividing cumulative 75 vol. % diameter by cumulative 25 vol. % diameter D; and the maximum particle diameter in particle-diameter fraction frequency distribution E were calculated.

<Specific Surface Area of Powder>

It was measured by a constant pressure ventilation type powder's specific surface area measurement apparatus (manufactured by Shimadzu Corporation).

<Abrasiveness of Powder>

Each 20 g of samples were sprayed to the surface of a 0.5 mm-thick SUS 304 plate at 100 mm distance by a spray gun (Iwata W-100, air pressure 0.3 MPa), and thereafter the powder deposited on the surface was wiped out and the surface of the plate was observed. When apparent scratches were observed, x was marked: when slight scratches were observed, however the plate was usable, Δ was marked: and when scratches were not at all observed, ○ was marked.

Example 1

R Heavy Calcium Carbonate (manufactured by Maruo Calcium Co., Ltd.), which is commercially available heavy calcium carbonate, was classified by a fluid classifying apparatus Turbo Classifier TC-15 (manufactured by NISSHIN ENGINEERING INC.) under the classification condition shown in Table 1 into a fine powder side (a cyclone separator, a bag filter) and a coarse powder side. The coarse powder side was recovered, an irregular and polyhedral heavy calcium carbonate powder having a cumulative 50 vol. % diameter (median diameter) of the respective inorganic particles A; a cumulative undersize for one-half the cumulative 50 vol. % diameter (median diameter) B; a value obtained by dividing cumulative 90 vol. % diameter by cumulative 10 vol. % diameter C; a value obtained by dividing cumulative 75 vol. % diameter by cumulative 25 vol. % diameter D; a maximum particle diameter in particle-diameter fraction frequency distribution E; and a constant pressure ventilation type powder's specific surface area Sw as shown in Table 1 was prepared and the obtained powder was sieved by passing a JIS Standard sieve with 45 μm mesh to obtain a filler for powder coating materials.

Example 2

N-35 (manufactured by Maruo Calcium Co., Ltd.), which is commercially available heavy calcium carbonate, was classified by Turbo Classifier TC-15 under the first classification condition shown in Table 1, the coarse powder side was recovered and again classified under the second classification condition shown in Table 1. The coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 45 μm mesh to obtain a filler for powder coating materials.

Example 3

R Heavy Calcium Carbonate (manufactured by Maruo Calcium Co., Ltd.) same as that used in Example 1 was classified by Turbo Classifier TC-15 under the classification condition shown in Table 1, the coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 45 μm mesh to obtain a filler for powder coating materials.

Example 4

Commercialized first-grade heavy calcium carbonate (manufactured by Sankyo Seifun Co., Ltd.) was classified by Turbo Classifier TC-15 under the classification condition shown in Table 1, the coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 45 μm mesh to obtain a filler for powder coating materials.

Example 5

Super S (manufactured by Maruo Calcium Co., Ltd.), which is commercially available heavy calcium carbonate, was classified by Turbo Classifier TC-15 under the classification condition shown in Table 1, and the coarse powder side was recovered and again classified under the second classification condition shown in Table 1. The coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 32 μm mesh to obtain a filler for powder coating materials.

Figure 3:
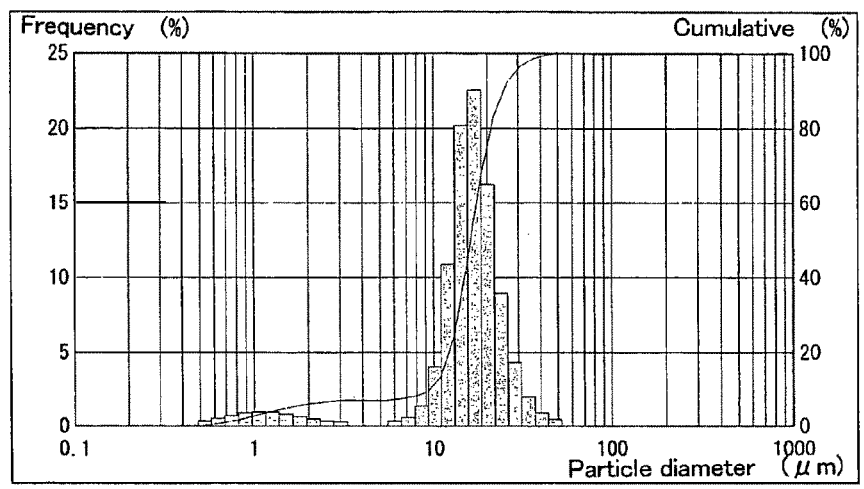
FIG. 3 shows a particle size distribution of the filler for powder coating materials, which is produced in Example 5, determined by a laser type particle size distribution meter, Microtrac FRA.

An electron microscopic photograph (500 times magnification) of the obtained filler for powder coating materials is shown in FIG. 1 and the particle size distribution determined by a laser type particle size distribution meter, Microtrac FRA is shown in FIG. 3.

Figure 2:
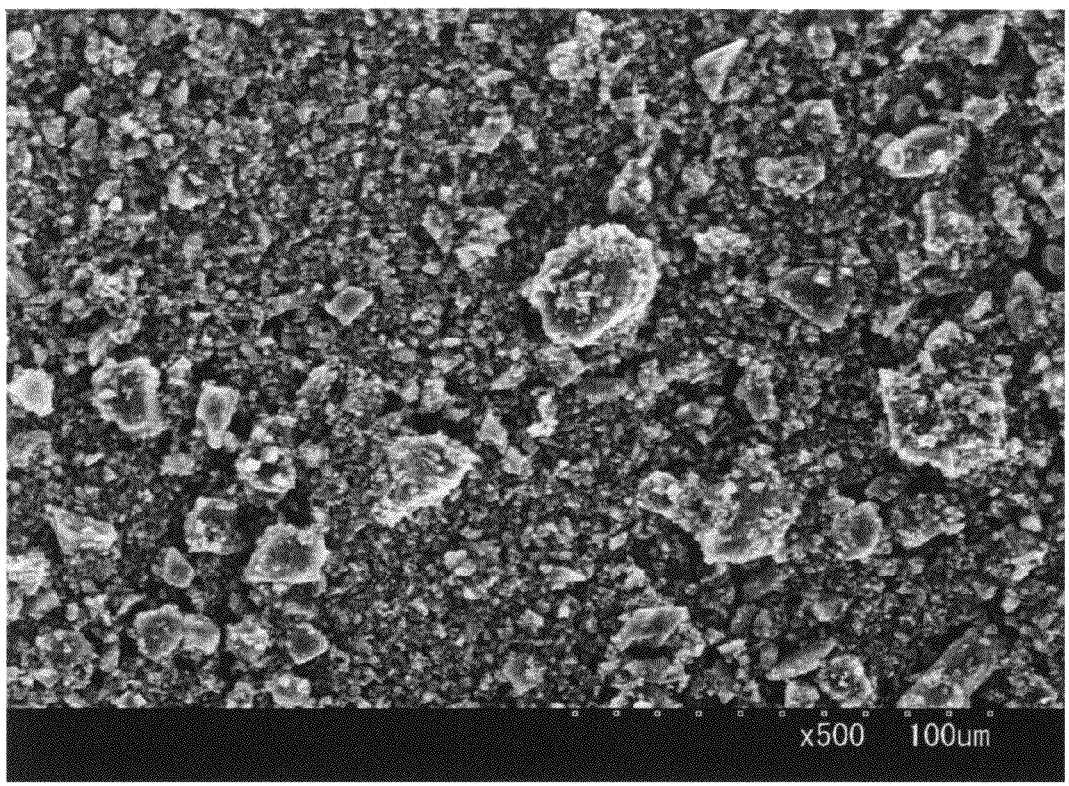
FIG. 2 shows an electron microscopic photograph (500 times magnification) of a filler for powder coating materials, which is common heavy calcium carbonate (N-35: manufactured by Maruo Calcium Co., Ltd., employed in Comparative Example 9), having 16.6 μm for the cumulative 50 vol. % diameter A determined by Microtrac FRA.
Figure 4:
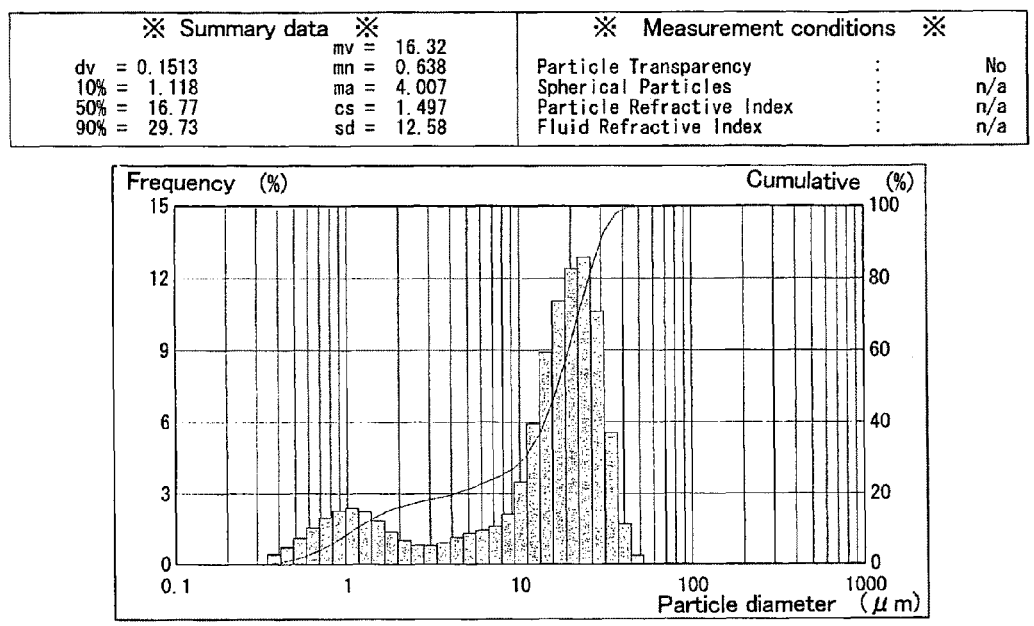
FIG. 4 shows a particle size distribution of the filler for powder coating materials, which is common heavy calcium carbonate (N-35: manufactured by Maruo Calcium Co., Ltd., employed in Comparative Example 9), determined by a laser type particle size distribution meter, Microtrac FRA.

For the powder of Comparative Example 9, which will be described below, an electron microscopic photograph is shown in FIG. 2 and the particle size distribution is shown in FIG. 4. The powder of Example 5 and the powder of Comparative Example 9 had similar values for the cumulative 50 vol. % diameter (median diameter) in the particle size distribution, however, it was apparent in the electron microscopic observation field that the number of particles with 10 to 30 μm size was higher and ultrafine particles are less in the powder of Example 5. These uniform particles form uniform surface projections and provide stable matte property after drying a coating film of the powder coating material.

Example 6

Super SS (manufactured by Maruo Calcium Co., Ltd.), which is commercially available heavy calcium carbonate, was classified by Turbo Classifier TC-15 under the classification condition shown in Table 1, the coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 7

Super S (manufactured by Maruo Calcium Co., Ltd.), which is the same heavy calcium carbonate as that of Example 1, was classified by Turbo Classifier TC-15 under the classification condition shown in Table 1 and recovered by a cyclone separator (in the fine powder side) and the recovered powder was again classified under the second classification condition shown in Table 1. The coarse powder side was recovered to prepare a heavy calcium carbonate powder having the particle size characteristics A to E and the constant pressure ventilation type powder's specific surface area Sw as shown in Table 1 and the obtained powder was sieved by passing a JIS Standard sieve with 75 μm mesh to obtain a filler for powder coating materials.

Example 8

Super 4S (manufactured by Maruo Calcium Co., Ltd.), which is commercially available heavy calcium carbonate, was classified by Turbo Classifier TC-15 under the classification condition shown in Table 1, the coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 9

Super #2000 (manufactured by Maruo Calcium Co., Ltd.), which is commercially available heavy calcium carbonate, was classified by Turbo Classifier TC-15 under the classification condition shown in Table 1, the coarse powder side was recovered and again classified under the second classification condition shown in Table 1. The coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 10

The cyclone product (the fine powder side) obtained by the first classification in Example 9 was mixed with 2 parts by weight of polyethylene wax (LANKO TF 1778, manufactured by Lubrizol Corp.), heated and stirred to 130° C. from normal temperature by a super mixer to carry out surface-treatment and thereafter, the obtained product was classified by Turbo Classifier TC-15 under the classification condition shown in Table 1, the coarse powder side was recovered and again classified under the second classification condition shown in Table 1. The coarse powder side was recovered to prepare a heavy calcium carbonate powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 11

Barite BNW (manufactured by FUJI TALC INDUSTRIAL CO., LTD.), which is commercially available barite (barium sulfate), was classified by Turbo Classifier TC-15 under the first classification condition shown in Table 1, the coarse powder side was recovered and again classified under the second classification condition shown in Table 1. The coarse powder side was recovered to prepare an irregular and polyhedral barium sulfate powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 12

HO-#100 (manufactured by Sankyo Seifun Co., Ltd.), which is commercially available fluorite (calcium fluoride), was classified by Turbo Classifier TC-15 under the classification condition shown in Table 1, the coarse powder side was recovered to prepare a calcium fluoride powder having the particle size characteristics A to E and the constant pressure ventilation type powder's specific surface area Sw as shown in Table 1, and the obtained powder was sieved by passing a JIS Standard sieve with 75 μm mesh to obtain a filler for powder coating materials.

Example 13

K-1B (manufactured by Nippon Talc Co., Ltd.), which is commercially available talc, was classified by Turbo Classifier TC-15 under the classification condition shown in Table 1, the coarse powder side was recovered to prepare a talc powder having the particle size characteristics A to E and the constant pressure ventilation type powder's specific surface area Sw as shown in Table 1 and a filler for powder coating materials was obtained.

Example 14

Synthesized calcium carbonate shown in Example 4 of JP-A No. 10-130020 was produced to prepare synthesized calcium carbonate having the particle size characteristics A to E and the constant pressure ventilation type powder's specific surface area Sw as shown in Table 1.

Comparative Example 1

FS-200 (manufactured by Denki Kagaku Kogyo K.K.), which is commercially available fused silica, having the particle size characteristics A to E and the constant pressure ventilation type powder's specific surface area Sw as shown in Table 2 was prepared.

Comparative Example 2

Silicic SS-100 (manufactured by Yamamori Tsuchimoto Mining Co., LTD.), which is commercially available silica rock powder, having the particle size characteristics A to E and the constant pressure ventilation type powder's specific surface area Sw as shown in Table 2 was prepared.

Comparative Example 3

Super-grade A-3 (manufactured by Yamamori Tsuchimoto Mining Co., LTD.), which is commercially available quartz sand, having the particle size characteristics A to E and the constant pressure ventilation type powder's specific surface area Sw as shown in Table 2 was prepared.

Comparative Example 4

Minex SP (manufactured by Shiraishi Calcium Kaisha, Ltd.), which is commercially available Nepheline syenite, having the particle size characteristics A to E and the constant pressure ventilation type powder's specific surface area Sw as shown in Table 2 was prepared.

Comparative Example 5

AO-820 (manufactured by Admatechs CO., LTD.), which is commercially available spherical alumina, having the particle size characteristics A to E and the constant pressure ventilation type powder's specific surface area Sw as shown in Table 2 was prepared.

Comparative Example 6

AD barium sulfate (manufactured by Nippon Chemical Industrial Co., Ltd.), which is commercially available synthesized barium sulfate, having the particle size characteristics A to E and the constant pressure ventilation type powder's specific surface area Sw as shown in Table 2 was prepared.

Comparative Example 7

Super #1700 (manufactured by Maruo Calcium Co., Ltd.), which is heavy calcium carbonate, having the particle size characteristics A to E and the constant pressure ventilation type powder's specific surface area Sw as shown in Table 2 was prepared.

Comparative Example 8

SFT-2000 (manufactured by Sankyo Seifun Co., Ltd.), which is heavy calcium carbonate, having the particle size characteristics A to E and the constant pressure ventilation type powder's specific surface area Sw as shown in Table 2 was prepared.

Comparative Example 9

N-35 (manufactured by Maruo Calcium Co., Ltd.), which is heavy calcium carbonate, having the particle size characteristics A to E and the constant pressure ventilation type powder's specific surface area Sw as shown in Table 2 was prepared.

An electron microscopic photograph (500 times magnification) of the obtained heavy calcium carbonate N-35 is shown in FIG. 2 and the particle size distribution determined by a laser type particle size distribution meter, Microtrac FRA is shown in FIG. 4.

Comparative Example 10

Super SS (manufactured by Maruo Calcium Co., Ltd.), which is heavy calcium carbonate, having the particle size characteristics A to E and the constant pressure ventilation type powder's specific surface area Sw as shown in Table 2 was prepared.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
|  |  | Inorganic particles | Heavy calcium carbonate | Heavy calcium carbonate | Heavy calcium carbonate | Heavy calcium carbonate | Heavy calcium carbonate | Heavy calcium carbonate | Heavy calcium carbonate |
|  |  | Hardness | 3 | 3 | 3 | 3 | 3 | 3 | 3 |
|  |  | A | 29.3 | 26.1 | 25.7 | 19.1 | 16.2 | 9.6 | 9.8 |
|  |  | B | 17 | 7 | 32 | 13 | 8 | 23 | 12 |
|  |  | C | 18 | 3 | 24 | 7 | 3 | 14 | 13 |
|  |  | D | 2.1 | 1.7 | 3.1 | 1.8 | 1.5 | 2.1 | 1.2 |
|  |  | E | 88 | 62 | 88 | 74 | 52 | 37 | 35 |
|  |  | Sw | 1700 | 2000 | 2800 | 2500 | 3000 | 5000 | 5200 |
|  |  | $\rho$ | 2.7 | 2.7 | 2.7 | 2.7 | 2.7 | 2.7 | 2.7 |
|  |  | Abrasiveness of powder | ○ | ○ | ○ | ○ | ○ | ○ | ○ |
| Classification conditions | 1st time | Feed amount (kg/h) | 5 | 2 | 4 | 4 | 3 | 3 | 3 |
|  |  | Number of revolutions of rotor (rpm) | 2500 | 3000 | 8000 | 6000 | 3000 | 5000 | 3000 |
|  |  | Air flow ($m^3$/min) | 2 | 2 | 1.2 | 2 | 2 | 1.5 | 2 |
|  |  | Recovery spot | Coarse powder | Coarse powder | Coarse powder | Coarse powder | Coarse powder | Coarse powder | Cyclone |
|  | 2nd time | Feed amount (kg/h) | — | 3 | — | — | 3 | — | 2 |
|  |  | Number of revolutions of rotor (rpm) | — | 1500 | — | — | 1000 | — | 2500 |
|  |  | Air flow ($m^3$/min) | — | 2 | — | — | 1.5 | — | 2 |
|  |  | Recovery spot | — | Coarse powder | — | — | Coarse powder | — | Coarse powder |

|  |  |  | Ex. 8 | Ex. 9 | Ex. 10 | Ex. 11 | Ex. 12 | Ex. 13 | Ex. 14 |
|---|---|---|---|---|---|---|---|---|---|
|  |  | Inorganic particles | Heavy calcium carbonate | Heavy calcium carbonate | Heavy calcium carbonate | Barium sulfate | Calcium fluoride | Talc | Synthesized calcium carbonate |
|  |  | Hardness | 3 | 3 | 3 | 3.3 | 4 | 1 | 3 |
|  |  | A | 7.6 | 4.1 | 4.3 | 20.2 | 10.2 | 8.1 | 4.7 |
|  |  | B | 26 | 22 | 16 | 11 | 20 | 12 | 20 |
|  |  | C | 13 | 21 | 18 | 3 | 14 | 4 | 2 |
|  |  | D | 3.6 | 2.4 | 1.8 | 1.7 | 2.3 | 2.0 | 2.8 |
|  |  | E | 26 | 35 | 10 | 88 | 45 | 37 | 88 |
|  |  | Sw | 6800 | 14400 | 11000 | 1400 | 2600 | 15100 | 1800 |
|  |  | $\rho$ | 2.7 | 2.7 | 2.7 | 4.5 | 3.2 | 2.8 | 2.7 |
|  |  | Abrasiveness of powder | ○ | ○ | ○ | ○ | Δ | ○ | ○ |
| Classification conditions | 1st time | Feed amount (kg/h) | 3 | 1.5 | 1 | 2 | 3.5 | 1.7 | — |
|  |  | Number of revolutions of rotor (rpm) | 6000 | 8000 | 9000 | 2000 | 6000 | 6500 | — |
|  |  | Air flow ($m^3$/min) | 1.5 | 1.2 | 1.2 | 1.8 | 1.2 | 2 | — |
|  |  | Recovery spot | Coarse powder | Coarse powder | Coarse powder | Coarse powder | Coarse powder | Coarse powder | — |
|  | 2nd time | Feed amount (kg/h) | — | 2 | 1.5 | 3 | — | — | — |
|  |  | Number of revolutions of rotor (rpm) | — | 6000 | 5000 | 800 | — | — | — |

TABLE 1-continued

| | | | | | | | |
|---|---|---|---|---|---|---|---|
| Air flow (m³/min) | — | 1.5 | 2 | 1.5 | — | — | — |
| Recovery spot | — | Coarse powder | Coarse powder | Coarse powder | — | — | — |

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Inorganic particles | Fused silica | Silica rock powder | Quartz sand | Nepheline syenite | Spherical alumina | Synthesized barium sulfate | Heavy calcium carbonate | Heavy calcium carbonate | Heavy calcium carbonate | Heavy calcium carbonate |
| Hardness | 7 | 7 | 7 | 6 | 9 | 3.3 | 3 | 3 | 3 | 3 |
| A | 29.1 | 5.4 | 15.7 | 13.1 | 25 | 1.4 | 1.6 | 34.6 | 16.8 | 3.9 |
| B | 20 | 29 | 9 | 21 | 13 | 12 | 17 | 16 | 26 | 38 |
| C | 22 | 14 | 3 | 14 | 7 | 4 | 10 | 8 | 27 | 19 |
| D | 2.8 | 4.6 | 1.6 | 2.3 | 1.6 | 2 | 3.6 | 2.0 | 3.1 | 7.4 |
| E | 88 | 62 | 62 | 74 | 44 | 8 | 22 | 104 | 52 | 37 |
| Sw | 2700 | 11600 | 3200 | 3200 | 1400 | 9100 | 17100 | 1800 | 3400 | 9800 |
| ρ | 2.2 | 2.6 | 2.6 | 2.6 | 4 | 4.5 | 2.7 | 2.7 | 2.7 | 2.7 |
| Abrasiveness of powder | X | X | X | X | X | ○ | ○ | ○ | ○ | ○ |

Examples 15 to 28 and Comparative Examples 11 to 15

Respective powder coating compositions were produced by using fillers for powder coating materials obtained by Examples 1 to 14 and Comparative Examples 6 to 10 in the following manner, and tests for the physical properties of the coating materials were carried out.

(Epoxy Type Powder Coating Composition)
Epoxy resin: (Epikote 1004, manufactured by Yuka Shell Epoxy K.K.)
Curing agent: dicyanodiamide
Filler for powder coating materials: the filler for powder coating materials obtained by Example 1
Surface adjustment agent: (CF-1056, manufactured by Toshiba Silicone Co., Ltd.)
Coloring pigment: titanium dioxide
(Polyester Type Powder Coating Composition)
Polyester resin: (Finedic M8021, manufactured by Dainippon Ink and Chemicals, Inc.)
Curing agent: ε-caprolactam blocked isocyanate (Adduct B-1530, manufactured by Huls A. G.)
Filler for powder coating materials: the fillers for powder coating materials obtained by Examples 2, 4 to 14, and Comparative Examples 6 and 10
Surface adjustment agent: (CF-1056, manufactured by Toshiba Silicone Co., Ltd.)
Coloring pigment: titanium dioxide
(Acrylic Type Powder Coating Composition)
Acrylic resin: (Finedic M8021, manufactured by Dainippon Ink and Chemicals, Inc.)
Curing agent: decanedicarboxylic acid (Adduct B-1530, manufactured by Huls A. G.)
Bisphenol A type epoxy resin: (YD-012, manufactured by Tohto Kasei Co., Ltd.)
Filler for powder coating materials: the filler for powder coating materials obtained by Example 3
Surface adjustment agent: (CF-1056, manufactured by Toshiba Silicone Co., Ltd.)
Coloring pigment: titanium dioxide
Benzoin As raw materials, the above-mentioned components were mixed for about 3 minutes by a super mixer (manufactured by Nihon Spindle Manufacturing Co., Ltd.), melted and kneaded at about 100° C. by a co-kneader (manufactured by Buss A. G.). The mixtures were cooled to room temperature, pulverized by an atomizer (Fuji Paudal Co., Ltd.) after coarsely pulverizing and classified by a sieve with 150 mesh to obtain powder coating materials with a volume average particle diameter of 35 μm.

The respective powder coating materials produced in the above-mentioned method were applied to steel plates having a size of 200×100×0.8 mm coated with zinc phosphate by electrostatic spray coating with a corona discharge type coating gun so that a film thickness was 60 μm, the obtained film was baked under each condition of 180° C.×20 min and 200° C.×20 min and gradually cooled to room temperature. The coating film properties were evaluated by the following method.

<Appearance Evaluation>
⊚: Few irregularities are observed and the surface is in smooth coating film state.
○: A few irregularities are observed and the surface is in smooth coating film state.
Δ: A few irregularities are observed and a few bumps exist.
x: Irregularities are observed and the surface is slightly inferior in smoothness.

<Luster Value>
As described above, arbitrary 5 points were selected in the coating film face of each baked test plate with 180° C.×20 min and 200° C.×20 min, the 60 luster was measured by the gloss meter (manufactured by Nippon Denshoku Industries Co., Ltd.) and the average value was defined as the evaluation value.

<Erichsen Test>
Measurement was carried out according to JIS K5400 (1990) and the results were shown. Erichsen value is for determining stretch processability of steel plates. Erichsen value is measured by pushing a hard ball punch to a test specimen and defined as a value corresponding to a movement distance (mm) from a crinkling presser face at the tip end of the punch at the moment when a crack reaches at least one point in the rear face of the test specimen. As Erichsen value is higher, the stretch processability is more advantageous. Generally, the processability is inferior unless the value is 4 mm or higher.

<Resistance to Weight Dropping>

An impact resistance test (Du-Pont method) was carried out with Φ ½"×500 g according to JIS K5600-5.3. As the numeral value (height: cm) is higher, the resistance is better.

TABLE 3

|  | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|
| Ex. No. of filler used | Ex. 1 | Ex. 2 | Ex. 3 | Ex. 4 | Ex. 5 | Ex. 6 | Ex. 7 | Ex. 8 | Ex. 9 | Ex. 10 |
| Kind of resin | Epoxy | Polyester | Acryl | Polyester | Polyester | Polyester | Polyester | Polyester | Polyester | Polyester |
| Resin (wt. %) | 56 | 55 | 55 | 55 | 55 | 65 | 65 | 65 | 65 | 65 |
| Filler (wt. %) | 35 | 30 | 30 | 30 | 30 | 20 | 20 | 20 | 20 | 20 |
| Curing agent (wt. %) | 4 | 10 | 10 | 10 | 10 | 10 | 10 | 10 | 10 | 10 |
| Surface adjustment agent (wt. %) | 0.5 | 0.5 | 0.5 | 0.5 | 0.5 | 0.5 | 0.5 | 0.5 | 0.5 | 0.5 |
| Coloring pigment (wt. %) | 4.5 | 4.5 | 4.5 | 4.5 | 4.5 | 4.5 | 4.5 | 4.5 | 4.5 | 4.5 |
| Appearance | ◯ | ◉ | ◯ | ◯ | ◉ | ◉ | ◯ | ◯ | ◯ | ◉ |
| Luster value | 28 | 30 | 46 | 40 | 32 | 65 | 61 | 73 | 75 | 58 |
| Erichsen value (mm) | 4.5 | 6 | 4.5 | 6 | 6 | 5.5 | 7 | 5 | 4.5 | 6.5 |
| Resistance to weight dropping (cm) | 55 | 60 | 50 | 60 | 60 | 65 | 60 | 55 | 60 | 65 |

TABLE 4

|  | Ex. 25 | Ex. 26 | Ex. 27 | Ex. 28 | Comp. Ex. 11 | Comp. Ex. 12 | Comp. Ex. 13 | Comp. Ex. 14 | Comp. Ex. 15 |
|---|---|---|---|---|---|---|---|---|---|
| Ex. or Comp. Ex. No. of filler used | Ex. 11 | Ex. 12 | Ex. 13 | Ex. 14 | Comp. Ex. 6 | Comp. Ex. 7 | Comp. Ex. 8 | Comp. Ex. 9 | Comp. Ex. 10 |
| Kind of resin | Polyester | Polyester | Polyester | Polyester | Polyester | Polyester | Polyester | Polyester | Polyester |
| Resin (wt. %) | 55 | 65 | 65 | 65 | 65 | 65 | 55 | 55 | 65 |
| Filler (wt. %) | 30 | 20 | 20 | 20 | 20 | 20 | 30 | 30 | 20 |
| Curing agent (wt. %) | 10 | 10 | 10 | 10 | 10 | 10 | 10 | 10 | 10 |
| Surface adjustment agent (wt. %) | 0.5 | 0.5 | 0.5 | 0.5 | 0.5 | 0.5 | 0.5 | 0.5 | 0.5 |
| Coloring pigment (wt. %) | 4.5 | 4.5 | 4.5 | 4.5 | 4.5 | 4.5 | 4.5 | 4.5 | 4.5 |
| Appearance | ◯ | ◯ | ◉ | ◯ | ◯ | Δ | X | Δ | X |
| Luster value | 72 | 68 | 77 | 68 | 88 | 82 | 33 | 51 | 73 |
| Erichsen value (mm) | 4 | 4.5 | 4.5 | 5 | 5 | 2.1 | 5.5 | 3 | 2.3 |
| Resistance to weight dropping (cm) | 50 | 55 | 50 | 55 | 55 | 40 | 35 | 40 | 40 |

INDUSTRIAL APPLICABILITY

As described above, the filler for powder coating materials of the present invention comprises inorganic particles with a specified Mohs hardness and specified particle size characteristics, so that the filler can be pulverized and classified by sieving without wearing facilities at the time of production and accordingly can be controlled to have desired particle size properties. Consequently, it is made possible to provide the filler for powder coating materials with specified particle size properties.

Further, the filler for powder coating materials of the present invention can provide a powder coating composition for forming a coating film having excellent matte property, a smooth surface with reduced irregularities, satisfactory appearance and excellent in processability and impact resistance.

What is claimed is:

1. A powder coating composition which comprises a filler for powder coating material and a powder coating resin as indispensable components, where the filler for powder coating material comprises inorganic particles having Mohs hardness of 1 to 4 and satisfying the following particle size distribution of the following relationships (1) to (6):

$$2 \leq A \leq 30 \quad (1),$$

$$0 \leq B \leq 35 \quad (2),$$

$$1 \leq C \leq 25 \quad (3),$$

$$1 \leq D \leq 6 \quad (4),$$

$$E \leq 100 \quad (5), \text{ and}$$

$$F \leq 100 \quad (6)$$

wherein,

A: Cumulative 50 vol. % diameter (median diameter) of the inorganic particles determined by a laser type particle size distribution meter (Microtrac FRA) [μm];

B: Cumulative undersize for one-half the cumulative 50 vol. % diameter (median diameter) of the inorganic particles determined by a laser type particle size distribution meter (Microtrac FRA) [vol. %]

C: Value obtained by dividing the cumulative 90 vol. % diameter of the inorganic particles determined by a laser type distribution meter (Microtrac FRA) by the cumulative 10 vol. % diameter [-];

D: Value obtained by dividing the cumulative 75 vol. % diameter of the inorganic particles determined by a laser type distribution meter (Microtrac FRA) by the cumulative 25 vol. % diameter [-];

E: Maximum particle diameter of the inorganic particles in particle-diameter fraction frequency distribution determined by a laser type distribution meter (Microtrac FRA) [μm]; and F: Oversize residue with a sieve with 32 μm mesh [ppm], wherein the inorganic particles have a powder specific surface area Sw under constant pressure ventilation from $4050/\rho$ to $40500/\rho$ ($cm^2/g$) wherein $\rho$ denotes an absolute specific gravity of the inorganic particles, and wherein the inorganic particles are heavy calcium carbonate.

2. The powder coating composition according to claim 1, wherein the powder coating resin comprises a thermosetting resin.

3. The powder coating composition according to claim 2, wherein the thermosetting resin comprises at least one resin selected from polyester resins, epoxy resins, epoxy-polyester resins, fluoro resins, acrylic resins, alkyd resins, phenolic resins, melamine resins, urea resins, urethane resins, block isocyanate resins, silicons resins, and amide resins.

4. The powder coating composition according to claim 3, wherein the addition amount of the filler for powder coating materials is 1 to 75 parts by weight based on 100 parts by weight of the powder coating resin.

* * * * *